United States Patent
Shin

(10) Patent No.: US 8,830,789 B2
(45) Date of Patent: Sep. 9, 2014

(54) APPARATUS AND METHOD FOR IMAGING A SUBSURFACE USING ACCUMULATED ENERGY OF WAVEFIELD

(75) Inventor: Changsoo Shin, Seoul (KR)

(73) Assignee: SNU R&DB Foundation, Seoul (KR)

( * ) Notice: Subject to any disclaimer, the term of this patent is extended or adjusted under 35 U.S.C. 154(b) by 671 days.

(21) Appl. No.: 12/974,350

(22) Filed: Dec. 21, 2010

(65) Prior Publication Data

US 2011/0194377 A1 Aug. 11, 2011

Related U.S. Application Data

(60) Provisional application No. 61/303,258, filed on Feb. 10, 2010.

(30) Foreign Application Priority Data

Aug. 24, 2010 (KR) .................. 10-2010-0082162

(51) Int. Cl.
- *G01V 1/00* (2006.01)
- *G01V 1/30* (2006.01)
- *G01V 1/28* (2006.01)

(52) U.S. Cl.
CPC ............... *G01V 1/303* (2013.01); *G01V 1/282* (2013.01)
USPC .............................................. 367/73; 367/24

(58) Field of Classification Search
USPC ......................................... 367/73; 702/14, 16
See application file for complete search history.

(56) References Cited

U.S. PATENT DOCUMENTS

| 2009/0006000 A1 | 1/2009 | Shin |
| 2010/0042391 A1 | 2/2010 | Shin |
| 2011/0000678 A1* | 1/2011 | Krebs et al. .................. 166/369 |

FOREIGN PATENT DOCUMENTS

| JP | 2006-098112 | 4/2006 |
| KR | 10-2008-0114488 | 12/2008 |
| KR | 10-2009-0116598 | 11/2009 |

OTHER PUBLICATIONS

Ha, Wansoo et al. "A Study of Waveform Inversion for Improvement of Sub-Salt Migration Image."Mulli-Tamsa, vol. 11, No. 3, 2008, pp. 117-183 (7 pages).

* cited by examiner

*Primary Examiner* — Luke Ratcliffe
*Assistant Examiner* — Hovhannes Baghdasaryan
(74) *Attorney, Agent, or Firm* — NSIP Law

(57) ABSTRACT

Provided is an apparatus of imaging a subsurface of a target area. The apparatus includes: an observed wavefield acquiring unit configured to acquire an observed wavefield for a target area based on seismic data; a parameter storage configured to store a characteristic parameter for the target area; a modeled wavefield creator configured to create a modeled wavefield corresponding to the observed wavefield using the characteristic parameter stored in the parameter storage; an energy calculator configured to calculate accumulated energies of the observed wavefield and the modeled wavefield, wherein the accumulated energies are defined as energies accumulated over time with respect to the observed wavefield and the modeled wavefield; and a parameter updating unit configured to update the characteristic parameter stored in the parameter storage such that a difference between the accumulated energy of the observed wavefield and the accumulated energy of the modeled wavefield is minimized.

14 Claims, 7 Drawing Sheets ial application claims the benefit under 35 U.S.C. §119 of
APPARATUS AND METHOD FOR IMAGING A SUBSURFACE USING ACCUMULATED ENERGY OF WAVEFIELD

CROSS-REFERENCE TO RELATED APPLICATIONS

This application claims the benefit under 35 U.S.C. §119 of U.S. Patent Application No. 61/303,258, filed on Feb. 10, 2010, and Korean Patent Application No. 10-2010-0082162, filed on Aug. 24, 2010, the entire disclosure of each of which is incorporated herein by reference for all purposes.

BACKGROUND

1. Field

The following description relates to subsurface survey, and more particularly, to a technique for imaging a subsurface through signal processing using waveform inversion.

2. Description of the Related Art

Waveform inversion is a technique of estimating a velocity model of the subsurface using prestack seismic data.

The waveform inversion means a series of processes for obtaining a subsurface structure model close to the actual subsurface structure of an area of interest by creating an initial model for the area of interest, obtaining observed wavefield on the area of interest, and iteratively updating the initial model using the observed wavefield. The processes are carried out by calculating modeled wavefield from an arbitrary subsurface using a computer and iteratively updating parameters representing the physical characteristics of the subsurface such that the differences of the theoretical values and data obtained through actual field exploration are minimized.

Waveform inversion is one method of analyzing the subsurface structure of an area, which is one of the goals of geophysical exploration, and various mathematical methods are suggested. One of representative mathematical methods for waveform inversion is an 'iterative least-squares method'. Generally, a unique solution does not exist in waveform inversion. Thus, a method of obtaining an optimal solution by adding a particular condition is used in waveform inversion. In this case, it is optional whether to give weight to convergence or to obtain a more accurate solution from a given measured data. Since an inverse model must be simplified and often requires extreme assumptions, it is important in waveform inversion to make the most of prior geological information related to geophysical characteristics.

One of the most important geological and physical characteristics for accurate subsurface imaging is the seismic propagation velocity of the subsurface medium. Recently, studies into a technique of artificially exploding a source wavelet into a target area, measuring a seismic wave against the target area and performing waveform inversion in a time domain or frequency domain on seismic data, i.e., data on a seismic wave reflected or refracted by the target area to obtain a seismic propagation velocity with respect to the subsurface medium are actively going on.

SUMMARY

The following description relates to a subsurface imaging apparatus and method that can efficiently use insufficient low frequency components in real data in order to obtain a velocity model close to a real subsurface.

In one general aspect, there is provided an apparatus of imaging a subsurface of a target area, the apparatus including: an observed wavefield acquiring unit configured to acquire an observed wavefield for a target area based on seismic data, a parameter storage configured to store a characteristic parameter for the target area, a modeled wavefield creator configured to create a modeled wavefield corresponding to the observed wavefield using the characteristic parameter stored in the parameter storage, an energy calculator configured to calculate accumulated energies of the observed wavefield and the modeled wavefield, the accumulated energies being defined as energies accumulated over time with respect to the observed wavefield and the modeled wavefield, and a parameter updating unit configured to update the characteristic parameter stored in the parameter storage such that a difference between the accumulated energy of the observed wavefield and the accumulated energy of the modeled wavefield is minimized.

In the apparatus, the energy calculator may be further configured to calculate the accumulated energies of the observed wavefield and the modeled wavefield, based on values obtained by integrating the p-th powers of absolute values of the observed wavefield and the modeled wavefield over time.

In the apparatus, the parameter updating unit may be further configured to: define an objective function that represents a difference between the accumulated energy of the observed wavefield and the accumulated energy of the modeled wavefield at each time-window, and update the characteristic parameter using a gradient of the objective function.

In the apparatus, the parameter updating unit may be further configured to define the objective function using the accumulated energy of the observed wavefield and the accumulated energy of the modeled wavefield.

In the apparatus, the parameter updating unit may be further configured to define the objective function using values obtained by taking logs of the accumulated energy of the observed wavefield and the accumulated energy of the modeled wavefield.

In the apparatus, the parameter updating unit may be further configured to calculate the gradient of the objective function using a Jacobian with respect to a characteristic parameter of the accumulated energy of the modeled wavefield.

In the apparatus, the parameter updating unit may be further configured to calculate the Jacobian with respect to the characteristic parameter of the accumulated energy of the modeled wavefield, by numerical approximation according to a finite differential method.

In the apparatus, the characteristic parameter may include a seismic velocity with respect to the target area.

The apparatus may further include a velocity model creator configured to create a velocity model of the target area using the updated characteristic parameter.

In another general aspect, there is provided a method of imaging a subsurface of a target area, the method including: acquiring an observed wavefield for a target area based on seismic data, setting a characteristic parameter for the target area and creating a modeled wavefield corresponding to the observed wavefield using the characteristic parameter, calculating accumulated energies of the observed wavefield and the modeled wavefield, wherein the accumulated energies are defined as energies accumulated over time with respect to the observed wavefield and the modeled wavefield, and updating the characteristic parameter such that a difference between the accumulated energy of the observed wavefield and the accumulated energy of the modeled wavefield is minimized.

In the method, the calculating of the accumulated energies of the observed wavefield and the modeled wavefield may include calculating the accumulated energies of the observed wavefield and the modeled wavefield, based on values obtained by integrating the p-th powers of absolute values of the observed wavefield and the modeled wavefield over time.

In the method, the updating of the characteristic parameter may include: defining an objective function that represents a difference between the accumulated energy of the observed wavefield and the accumulated energy of the modeled wavefield at each time-window, and updating the characteristic function using a gradient of the objective function.

In the method, the updating of the characteristic parameter may include defining the objective function using the accumulated energy of the observed wavefield and the accumulated energy of the modeled wavefield.

In the method, the updating of the characteristic parameter may include defining the objective function using values obtained by taking logs of the accumulated energy of the observed wavefield and the accumulated energy of the modeled wavefield.

In the method, the updating of the characteristic parameter may include calculating the gradient of the objective function using a Jacobian with respect to a characteristic parameter of the accumulated energy of the modeled wavefield.

In the method, the updating of the characteristic parameter may include calculating the Jacobian with respect to the characteristic parameter of the accumulated energy of the modeled wavefield, by numerical approximation according to a finite differential method.

In the method, the characteristic parameter may include a seismic velocity with respect to the target area.

The method may further include a velocity model of the target area using the updated characteristic parameter.

Other features and aspects may be apparent from the following detailed description, the drawings, and the claims.

Figure 1:
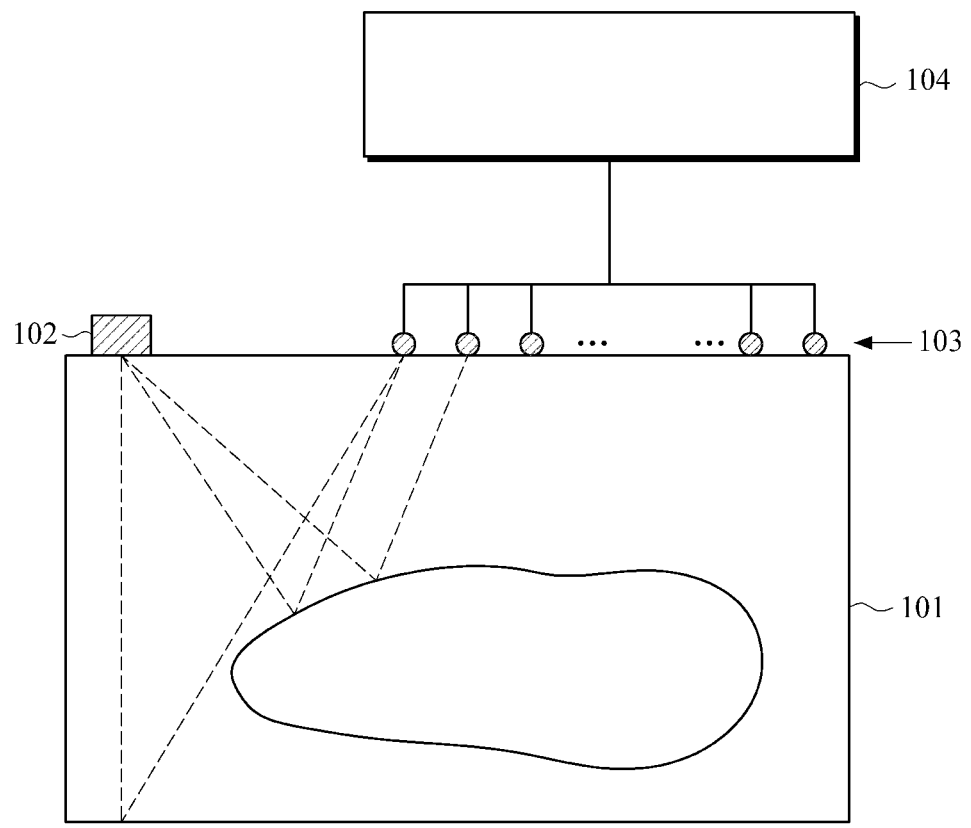
FIG. 1 illustrates a schematic configuration of an example of a subsurface imaging apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a schematic configuration of an example of a subsurface imaging apparatus.

Referring to FIG. 1, the subsurface imaging apparatus may include a source 102 provided on a target area 101, a plurality of receivers 103, and a signal processor 104. The source 102 generates a sound wave and an oscillating wave. The sound wave and oscillating wave are transferred to the target area 101. The receivers 103 measure the reflected waves of the sound wave and oscillating wave against several points of the target area 101. The characteristics of the sound wave or oscillating wave measured by each receiver 103 depend on the subsurface of the target area 101. The signal processor 104 processes the reflected sound wave or oscillating waves, thus generating image data for the target area 101.

In order to generate image data for the target area 101, the signal processor 104 may create a velocity model for the target area 101. The velocity model may represent a velocity distribution of the target area 101 obtained by applying a seismic wave to the target area 101. For example, since the velocity of a seismic wave applied to the target area 101 depends on the characteristics (for example, the kinds or densities of mediums) of the inner parts of the target area 101, the subsurface of the target area 101 may be easily imaged by obtaining a velocity model that represents the velocity distribution of the seismic wave.

Also, the signal processor 104 may create the velocity model through waveform inversion. The waveform inversion means a series of processes for obtaining a subsurface structure model close to the actual subsurface structure of an area of interest by creating an initial model for the area of interest, obtaining measurement values on the area of interest, and iteratively updating the initial model using the measurement values. For example, the signal processor 104 builds an initial velocity model of the target area 101, acquires seismic data from the target area 101, and then iteratively updates the initial velocity model using the seismic data, obtaining a velocity model close to the actual seismic velocity distribution of the target area 101.

Figure 2:
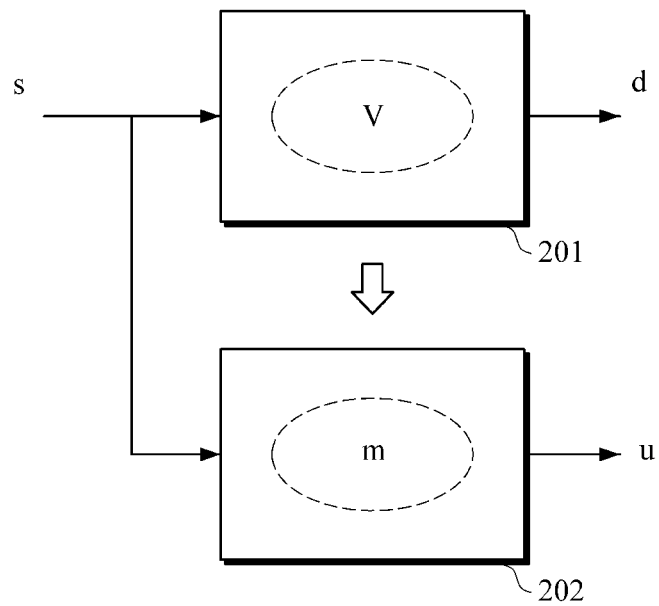
FIG. 2 is a view for explaining an example of a waveform inversion theory.

FIG. 2 is a view for explaining an example of a waveform inversion theory.

Referring to FIG. 2, a target area 201 has a certain characteristic V. The characteristic V may be one of various characteristics, such as a velocity of a seismic wave, a density or a temperature, for each inner part of the target area 201. In this case, when a certain input s is applied to the target area 201, an output d may be observed depending on the characteristic V. That is, the output d depends on the input s and the characteristic V. For example, under the same input s, a change of the characteristic V of the target area 201 may change the output d. Since the subsurface of the target area 201 can be easily modeled by obtaining the seismic velocity distribution with respect to the target area 201 among various characteristics of the target area 201, in the current example, it may be presumed that the characteristic V is a seismic velocity with respect to each inner part of the target area 201.

In this case, the target area 201 may be modeled using a velocity parameter m. Since the velocity parameter m will be iteratively updated later, at an initial stage, all inner parts of the target area 201 may be assigned the same velocity parameter. After the velocity parameter m is set, an output u when a certain virtual input s is applied to a modeled target area 202 may be obtained. That is, the output u corresponds to the output d, and if the velocity parameter m has been set to the same as the actual characteristic V, the output u may be equal to the output d. In other words, by adjusting the velocity parameter m such that the output u is equal to the output d, the same velocity parameter m as the actual characteristic V may be obtained.

Through such waveform inversion, the subsurface imaging apparatus may acquire measured data d and modeled data u for a target area, adjust the velocity parameter m such that the difference between the measured data d and modeled data u is minimized to estimate the characteristic V for the target area, and then create a velocity model and image data for the target area using the velocity parameter m (or the characteristic V).

Figure 3:
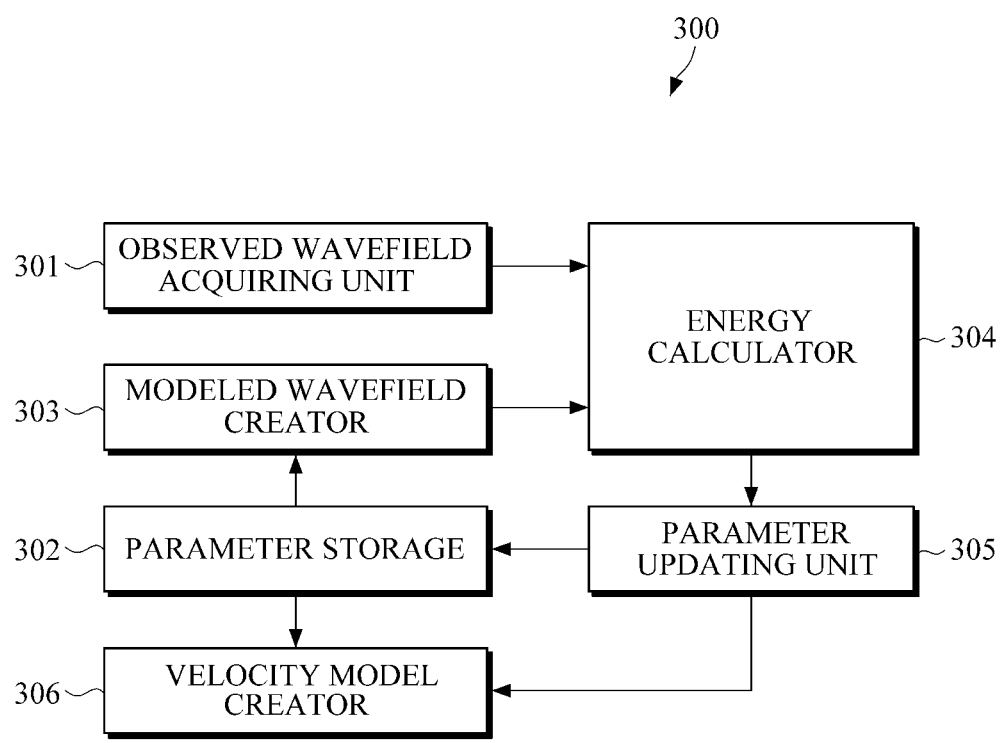
FIG. 3 is a diagram illustrating an example of a subsurface imaging apparatus.

FIG. 3 is a diagram illustrating an example of a subsurface imaging apparatus 300. The subsurface imaging apparatus 300 may correspond to a part of the signal processor 104 illustrated in FIG. 1.

Referring to FIG. 3, the subsurface imaging apparatus 300 may include an observed wavefield acquiring unit 301, a parameter storage 302, a modeled wavefield creator 303, an energy calculator 304, a parameter updating unit 305, and a velocity model creator 306.

The observed wavefield acquiring unit 301 acquires an observed wavefield from a target area. The observed wavefield may be seismic data measured from the target area. In the current example, the observed wavefield is represented as d.

The parameter storage 302 may store characteristic parameters for the target area. For example, the parameter storage 302 may store velocity parameters that represent the seismic velocities with respect to individual inner parts of the target area. The initial values of the characteristic parameters, which are stored in the parameter storage 302, may be set by a user and updated later by the parameter updating unit 305. In the current example, velocity parameters that are stored in the parameter storage 302 and updated by the parameter updating unit 305 are represented as m.

The modeled wavefield creator 303 creates a modeled wavefield corresponding to the observed wavefield using the characteristic parameters stored in the parameter storage 302. In the current example, the modeled wavefield is represented as u. A method of creating a modeled wavefield may be described in more detail, below.

When Fourier transform is performed on a wave equation in a time domain for a certain target area, a wave equation in a frequency domain is deduced below.

$$Ku(\omega) + i\omega Cu(\omega) - \omega^2 Mu(\omega) = f(\omega) \quad (1)$$

In Equation (1), w represents an angular frequency, $u(\omega)$ represents a discrete wavefield, M represents a mass matrix, C represents a viscous damping matrix, K represents a stiffness matrix, and $f(\omega)$ represents a transmission waveform in a frequency domain.

Equation (1) can be rewritten for simplicity, below.

$$Su = f$$

$$S = K + i\omega C - \omega^2 M \quad (2)$$

In Equation (2), S represents a complex impedance matrix and reflects a characteristic parameter (for example, a velocity parameter) for a target area. In other words, the modeled wavefield creator 303 may obtain a complex impedance matrix S using a velocity parameter M stored in the parameter storage 302, and define a modeled wavefield u based on the complex impedance matrix S and the transmission waveform f.

After the observed wavefield d and the modeled wavefield u are obtained, the energy calculator 304 calculates accumulated energy which is defined as energy accumulated over time with respect to the observed wavefield d and the modeled wavefield u in the time domain. For example, the energy calculator 304 may calculate accumulated energy by integrating the p-th power of the absolute value of each of the observed wavefield d and modeled wavefield u over time. For example, the accumulated energy $\tilde{u}^p$ of the modeled wavefield u can be calculated as follows.

$$\tilde{u}^p(\tau_{min}, \tau_{max}) = \int_{\tau_{min}}^{\tau_{max}} |u(t)|^p \, dt \, (0 \le \tau_{min} < \tau_{max} \le t_{max}) \quad (3)$$

According to Equation (3), the accumulated energy $\tilde{u}^p$ of the modeled wavefield u is obtained by taking the absolute value of the modeled wavefield u and integrating the p-th power of the absolute value from $\tau_{min}$ to $\tau_{max}$. The integration interval may be represented as a time-window applied to the observed wavefield and the modeled wavefield. In the current example, the size of the time window is from $\tau_{min}$ to $\tau_{max}$, however, may be set to any other interval.

Figure 6A:
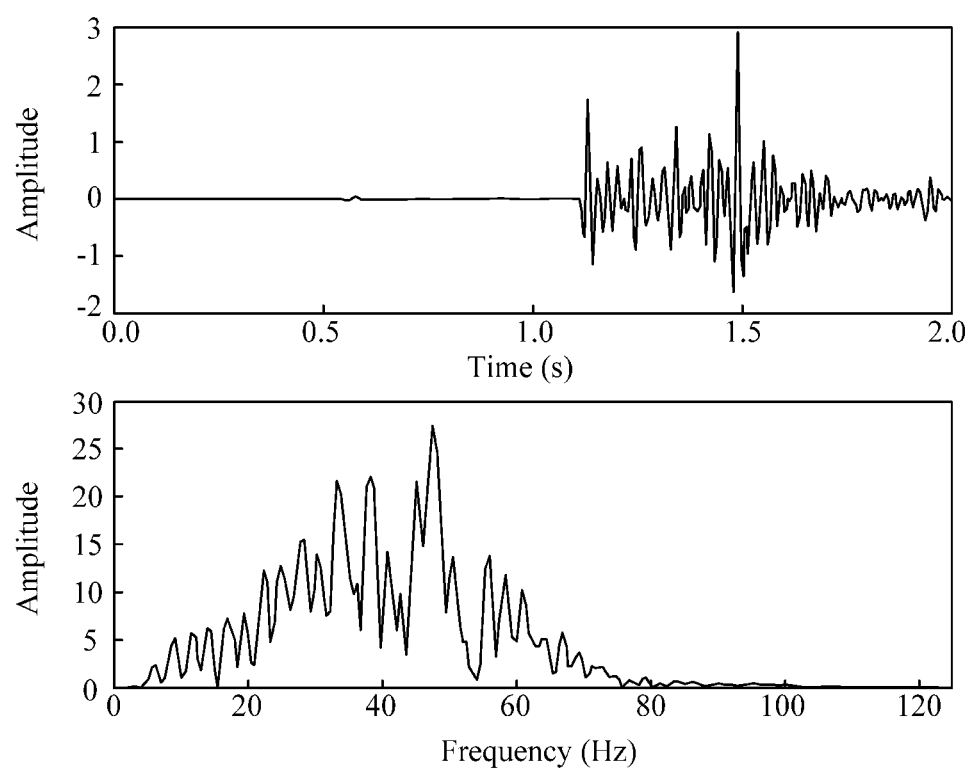
FIGS. 6A and 6B are graphs showing an observed wavefield and the energy of the observed wavefield.
Figure 6B:
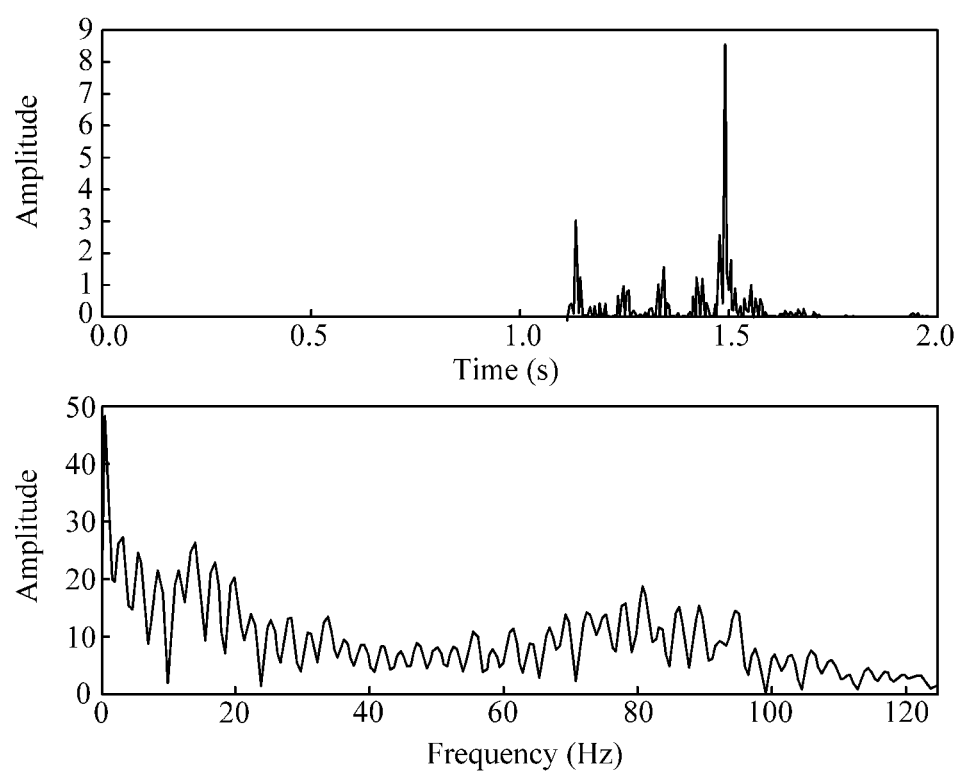

In this way, by the energy calculator 304 converting the observed wavefield d and the modeled wavefield u into energy, waveform inversion using low frequency components is possible so that a more accurate velocity model and image data can be obtained. For example, referring to FIGS. 6A and 6B, FIG. 6A shows an observed wavefield and FIG. 6B shows energy of the observed wavefield. As seen as data from 0 to 2 seconds, in FIG. 6A, there are little low frequency components below 5 Hz, whereas in FIG. 6B showing data converted into energy, there are many low frequency components below 5 Hz.

Referring again to FIG. 3, after the accumulated energy $\tilde{d}^p$ of the observed wavefield d and the accumulated energy $\tilde{u}^p$ of the modeled wavefield u are calculated, the parameter updating unit 305 updates the characteristics parameter stored in the parameter storage 302 such that the difference between the accumulated energy $\tilde{d}^p$ of the observed wavefield d and the accumulated energy $\tilde{u}^p$ the modeled wavefield u is minimized. For example, the parameter updating unit 305 may define an objective function that represents the difference between the accumulated energy $\tilde{d}^p$ of the observed wavefield d and the accumulated energy $\tilde{u}^p$ of the modeled wavefield u, and update the characteristic parameter stored in the parameter storage 302 using the gradient of the objective function. According to an example, the objective function may be defined using the accumulated energy $\tilde{d}^p$ of the observed wavefield d and the accumulated energy $\tilde{u}^p$ of the modeled wavefield u. In order to express the objective function as an equation, the accumulated energies $\tilde{d}^p$ and $\tilde{u}^p$ are subject to Fourier Transform and rewritten to:

$$\tilde{u}^p(m, \tau_0, \tau, \omega) = \int_{\tau_0}^{\tau} |u(m, t)|^p e^{-i\omega t} \, dt \, (0 \le \tau_0 < \tau \le t_{max}). \quad (4)$$

In Equation (4), m represents the characteristic parameter and $t_{max}$ represents the maximum recording time. Then, time integration is performed on the initial and zero frequency components of the observed wavefield d, and Equation (4) can be rewritten to:

$$\tilde{u}_0^p(m, \tau) = \tilde{u}^p(m, 0, \tau, 0) = \int_0^\tau |u(m, t)|^p \, dt. \quad (5)$$

Referring to Equations (3), (4), and (5), the accumulated energy $\tilde{u}^p$ of the modeled wavefield u is equal to the zero frequency component of the p-th power of the absolute value of the modeled wavefield u. Meanwhile, in order to minimize the difference between the accumulated energy $\tilde{d}^p$ of the observed wavefield d and the accumulated energy $\tilde{u}^p$ of the modeled wavefield, the objective function may be defined, below.

$$E_j = \sum_{s,r} \frac{1}{2} \int_0^{\tau_j} \left( \tilde{u}_0^p(m, \tau) - \tilde{d}_0^p(\tau) \right)^2 d\tau \qquad (6)$$

$$= \sum_{s,r} \frac{1}{2} \int_0^{\tau_j} \left( \int_0^\tau |u(m,t)|^p dt - \int_0^\tau |d(t)|^p dt \right)^2 d\tau,$$

$$j = 1, \ldots, n, 0 \le t_j \le \tau$$

In Equation (6), j represents a sample of each zero frequency component, and each sample may be obtained by adjusting the size of a time-window or the r value. In Equation (6), the characteristic parameter m can be updated in the direction in which the objective function is reduced, below.

$$m^{l+1} = m^l - (H_a + \lambda I)^{-1} \nabla_m E \qquad (7)$$

where $$H_a = J^T J,$$

$$J = \begin{bmatrix} \frac{\partial \tilde{u}_0^p}{\partial m_1} & \frac{\partial \tilde{u}_0^p}{\partial m_2} & \cdots & \frac{\partial \tilde{u}_0^p}{\partial m_M} \end{bmatrix}$$

In Equation (7), $m^{l+1}$ represents an updated characteristic parameter, $H_a$ represents the approximated Hessian, J represents the Jacobian, $\lambda I$ represents the damping coefficient, and $\nabla_m E$ represents the gradient of the objective function. In Equation (7), the gradient of the objective function can be calculated from the steepest descent direction, by the following Equation.

$$\frac{\partial E_j}{\partial m_k} = \sum_{s,r} \int_0^{\tau_j} \left( \tilde{u}_0^p(m, \tau) - \tilde{d}_0^p(m, \tau) \right) \frac{\partial \tilde{u}_0^p(m, \tau)}{\partial m_k} d\tau, \qquad (8)$$

$$j = 1, \ldots, n$$

Also, in Equation (8), the partial derivative value of the accumulated energy $\tilde{u}^p$ of the modeled wavefield u with respect to the characteristic parameter m can be calculated by numerical approximation according to the finite differential method and the Taylor expansion, as follows in Equation (9):

$$\frac{\partial \tilde{u}_0^p(m, \tau)}{\partial m_k} = \frac{\partial}{\partial m_k} \int_0^\tau |u(m,t)|^p dt \qquad (9)$$

$$\approx \frac{\int_0^\tau |u(m+\Delta m_k, t)|^p dt - \int_0^\tau |u(m,t)|^p dt}{\Delta m_k}$$

$$\approx \frac{\int_0^\tau \left| u(m,t) + \Delta m_k \frac{\partial u(m,t)}{\partial m_k} \right|^p dt - \int_0^\tau |u(m,t)|^p dt}{\Delta m_k}$$

Referring to FIG. 3, after the parameter updating unit 305 updates the characteristic parameter m using Equations (4) to (9), the updated characteristic parameter is stored in the parameter storage 302, and the modeled wavefield creator 303 performs modeling using the updated characteristic parameter. The process may be repeated until the objective function becomes smaller than a predetermined threshold value.

Meanwhile, according to another example, the objective function may be defined using a value obtained by taking the logs of the accumulated energy $\tilde{u}^p$ of the observed wavefield d and the accumulated energy $\tilde{u}^p$ of the modeled wavefield. For example, the objective function may be defined as Equation (10) below.

$$E_j = \sum_{s,r} \frac{1}{2} \int_0^{\tau_j} \left( \log\left( \frac{\tilde{u}_0^p(m, \tau)}{\tilde{d}_0^p(\tau)} \right) \right)^2 d\tau, \qquad (10)$$

$$j = 1, \ldots, n$$

Also, when the objective function is defined using the log, the steepest descent direction for updating the characteristic parameter m can be given as Equation (11):

$$\frac{\partial E_j}{\partial m_k} = \sum_{s,r} \int_0^{\tau_j} \log\left( \frac{\tilde{u}_0^p(m, \tau)}{\tilde{d}_0^p(\tau)} \right) \frac{1}{\tilde{u}_0^p(m, \tau)} \frac{\partial \tilde{u}_0^p(m, \tau)}{\partial m_k} d\tau, \qquad (11)$$

$$j = 1, \ldots, n$$

where the Jacobian is $\frac{1}{\tilde{u}_0^p(m, \tau)} \frac{\partial \tilde{u}_0^p(m, \tau)}{\partial m_k}$ Referring again to FIG. 3, the characteristic parameter m is iteratively updated until the objective function becomes smaller than the predetermined threshold value, and the velocity model creator 306 creates a velocity model for the target area using the finally updated characteristic parameter. The velocity model created by the velocity model creator 306 may be an initial velocity model for creating image data. As described above, since the modeling and objective function according to the current example is based on accumulated energy and low frequency components, a more accurate image for the subsurface can be obtained by creating image data for the subsurface using the initial-velocity model.

Figure 4:
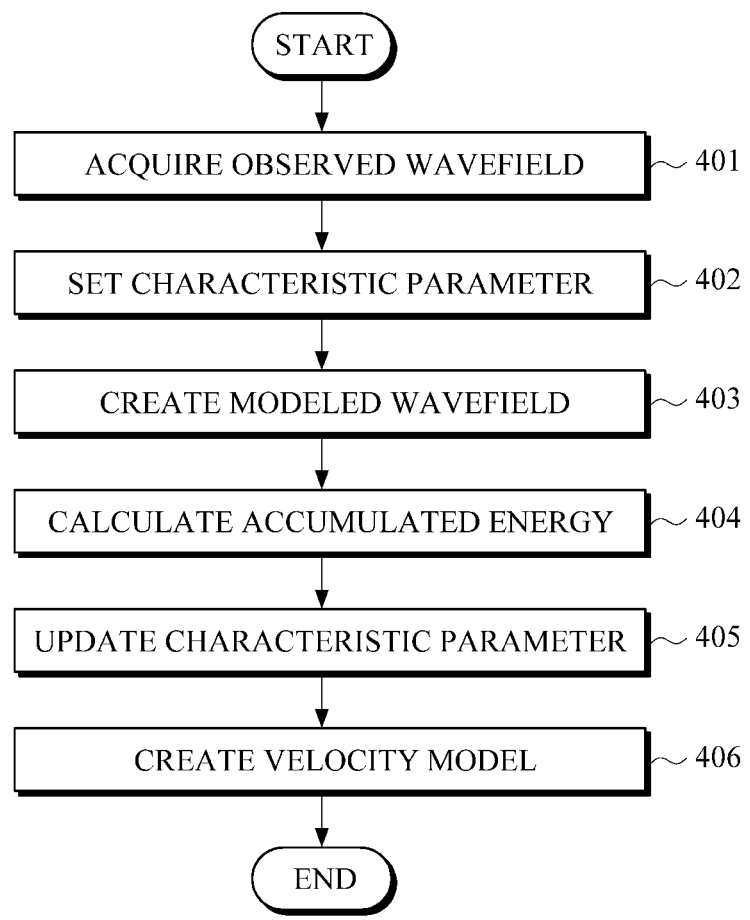
FIG. 4 is a flowchart illustrating an example of a subsurface imaging method.

FIG. 4 is a flowchart illustrating an example of a subsurface imaging method.

The subsurface imaging method will be described with reference to FIGS. 1, 3 and 4, below.

First, an observed wavefield for a target area is acquired (401). For example, the observed wavefield acquiring unit 301 receives seismic data through the plurality of receivers 103 provided on the target area 10, thus acquiring an observed wavefield d.

Then, a characteristic parameter for the target area is established (402). For example, an initial value of a velocity parameter may be stored as a characteristic parameter in the parameter storage 302.

Then, a modeled wavefield u corresponding to the observed wavefield d is created using the characteristic parameter (403). For example, the modeled wavefield creator 303 may create a modeled wavefield u using Equations (1) and (2).

Then, accumulated energies for the observed wavefield d and modeled wavefield u are calculated (404). For example, the energy calculator 304 may calculate the accumulated energy $\tilde{d}^p$ of the observed wavefield d and the accumulated energy $\tilde{u}^p$ of the modeled wavefield u using Equations (1) and (2).

Then, the characteristic parameter is updated, such that the difference between the accumulated energy $\tilde{u}^p$ of the observed wavefield d and the accumulated energy $\tilde{u}^p$ of the to modeled wavefield u is minimized (405). For example, the parameter updating unit 305 may update the characteristic parameter using Equations (4) to (11).

After the characteristic parameter is updated, a velocity model for the target area is created using the updated characteristic parameter (406). For example, the velocity model creator 306 may create a velocity model for the target area using a parameter stored in the parameter storage 302.

Figure 5:
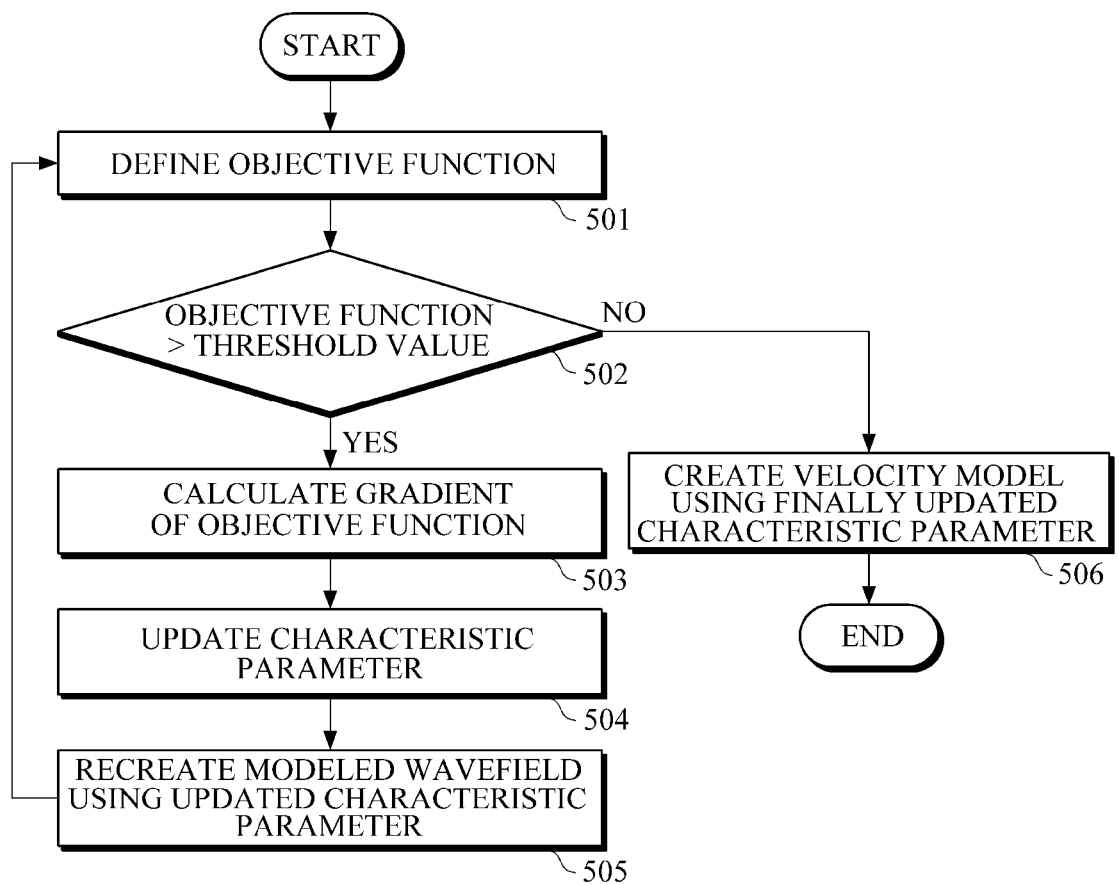
FIG. 5 is a flowchart illustrating an example of a characteristic parameter updating method.

FIG. 5 is a flowchart illustrating an example of a characteristic parameter updating method.

Referring to FIG. 5, in order to update the characteristic parameter such that the difference between the accumulated energy $\tilde{u}^p$ of the observed wavefield d and the accumulated energy $\tilde{u}^p$ of the modeled wavefield u is reduced, an objective function is defined using each of the accumulated energies $\tilde{d}^p$ and $\tilde{u}^p$ (501). For example, the parameter updating unit 305 may define the objective function using Equation (6) or (10).

After the objective function is defined, it is determined whether the objective function or the difference between the accumulated energies $\tilde{d}^p$ and $\tilde{u}^p$ is below a predetermined threshold value (502). If the objective function is not within a predetermined threshold range, the gradient of the objective function is calculated in order to update the characteristic parameter in the direction in which the objective function is reduced (503). For example, the parameter updating unit 305 may calculate the gradient of the objective function using Equations (8), (9), and (11), and update the characteristic parameter using the gradient of the objective function (504). For example, the parameter updating unit 305 may update the characteristic parameter using Equation (7).

Then, a modeled wavefield u is recreated using the updated characteristic parameter (505) and the process is repeated until the objective function is within the predetermined threshold range. Thereafter, when the objective function becomes smaller than a predetermined threshold value, a velocity model is created using the finally updated characteristic parameter (506).

As described above, according to the subsurface imaging apparatus and method, since waveform inversion is performed after a wavefield is converted into energy accumulated over time, low frequency components may be efficiently used-so that a more accurate image for the subsurface can be acquired.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus of imaging a subsurface of a target area, the apparatus comprising:
    an observed wavefield acquiring unit configured to acquire an observed wavefield for a target area based on seismic data;
    a parameter storage configured to store a characteristic parameter for the target area;
    a modeled wavefield creator configured to create a modeled wavefield corresponding to the observed wavefield using the characteristic parameter stored in the parameter storage;
    an energy calculator configured to calculate accumulated energies of the observed wavefield and the modeled wavefield, the accumulated energies being defined as energies accumulated over time with respect to the observed wavefield and the modeled wavefield; and
    a parameter updating unit configured to update the characteristic parameter stored in the parameter storage such that a difference between the accumulated energy of the observed wavefield and the accumulated energy of the modeled wavefield is reduced.

2. The apparatus of claim 1, wherein the energy calculator is further configured to calculate the accumulated energies of the observed wavefield and the modeled wavefield, based on values obtained by integrating the p-th powers of absolute values of the observed wavefield and the modeled wavefield over time.

3. The apparatus of claim 1, wherein the parameter updating unit is further configured to:
    define an objective function that represents a difference between the accumulated energy of the observed wavefield and the accumulated energy of the modeled wavefield at each time-window; and
    update the characteristic parameter using a gradient of the objective function.

4. The apparatus of claim 3, wherein the parameter updating unit is further configured to define the objective function using the accumulated energy of the observed wavefield and the accumulated energy of the modeled wavefield.

5. The apparatus of claim 3, wherein the parameter updating unit is further configured to define the objective function using values obtained by taking logs of the accumulated energy of the observed wavefield and the accumulated energy of the modeled wavefield.

6. The apparatus of claim 3, wherein the parameter updating unit is further configured to calculate the gradient of the objective function using a Jacobian with respect to a characteristic parameter of the accumulated energy of the modeled wavefield.

7. The apparatus of claim 6, wherein the parameter updating unit is further configured to calculate the Jacobian with respect to the characteristic parameter of the accumulated energy of the modeled wavefield, by numerical approximation according to a finite differential method.

8. A method of imaging a subsurface of a target area, the method being implemented by a program that is executable by a computer, the method comprising:
   acquiring an observed wavefield for a target area based on seismic data;
   setting a characteristic parameter for the target area and creating a modeled wavefield corresponding to the observed wavefield using the characteristic parameter;
   calculating accumulated energies of the observed wavefield and the modeled wavefield, wherein the accumulated energies are defined as energies accumulated over time with respect to the observed wavefield and the modeled wavefield;
   updating the characteristic parameter such that a difference between the accumulated energy of the observed wavefield and the accumulated energy of the modeled wavefield is reduced; and
   creating a velocity model of the target area using the updated characteristic parameter.

9. The method of claim 8, wherein the calculating of the accumulated energies of the observed wavefield and the modeled wavefield comprises calculating the accumulated energies of the observed wavefield and the modeled wavefield, based on values obtained by integrating the p-th powers of absolute values of the observed wavefield and the modeled wavefield over time.

10. The method of claim 8, wherein the updating of the characteristic parameter comprises:
    defining an objective function that represents a difference between the accumulated energy of the observed wavefield and the accumulated energy of the modeled wavefield at each time-window; and
    updating the characteristic function using a gradient of the objective function.

11. The method of claim 10, wherein the updating of the characteristic parameter comprises defining the objective function using the accumulated energy of the observed wavefield and the accumulated energy of the modeled wavefield.

12. The method of claim 10, wherein the updating of the characteristic parameter comprises defining the objective function using values obtained by taking logs of the accumulated energy of the observed wavefield and the accumulated energy of the modeled wavefield.

13. The method of claim 10, wherein the updating of the characteristic parameter comprises calculating the gradient of the objective function using a Jacobian with respect to a characteristic parameter of the accumulated energy of the modeled wavefield.

14. The method of claim 13, wherein the updating of the characteristic parameter comprises calculating the Jacobian with respect to the characteristic parameter of the accumulated energy of the modeled wavefield, by numerical approximation according to a finite differential method.

* * * * *